United States Patent
Tsukigi et al.

(10) Patent No.: US 10,641,629 B2
(45) Date of Patent: May 5, 2020

(54) CLAMP-ON TYPE ULTRASONIC FLOW SENSOR

(71) Applicant: Keyence Corporation, Osaka (JP)

(72) Inventors: Shinichi Tsukigi, Osaka (JP); Jiro Baba, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 16/268,513

(22) Filed: Feb. 6, 2019

(65) Prior Publication Data

US 2019/0285451 A1    Sep. 19, 2019

(30) Foreign Application Priority Data

Mar. 14, 2018  (JP) ................. 2018-047213

(51) Int. Cl.
| | | |
|---|---|---|
| *G01F 15/18* | (2006.01) | |
| *G01F 1/66* | (2006.01) | |
| *G01F 15/14* | (2006.01) | |

(52) U.S. Cl.
CPC ............. *G01F 1/667* (2013.01); *G01F 1/662* (2013.01); *G01F 15/14* (2013.01)

(58) Field of Classification Search
CPC ................................ G01F 15/18; G01F 1/662
See application file for complete search history.

(56) References Cited

U.S. PATENT DOCUMENTS

| | | | |
|---|---|---|---|
| 9,574,924 B2 * | 2/2017 | Allen | ................ G01F 1/667 |
| 9,671,263 B2 | 6/2017 | Otsu et al. | |
| 9,671,264 B2 | 6/2017 | Kashima | |
| 9,696,195 B2 | 7/2017 | Ishikawa et al. | |
| 10,190,896 B2 | 1/2019 | Makino et al. | |
| 10,203,234 B2 | 2/2019 | Ishikawa et al. | |
| 2014/0165740 A1 * | 6/2014 | Speidel | ................ B06B 1/0685 |
| | | | 73/861.28 |
| 2018/0364075 A1 * | 12/2018 | Bitto | .................... G01D 11/245 |

OTHER PUBLICATIONS

U.S. Appl. No. 16/268,510, filed Feb. 6, 2019 (92 pages).
U.S. Appl. No. 16/268,512, filed Feb. 6, 2019 (87 pages).
U.S. Appl. No. 16/268,514, filed Feb. 6, 2019 (99 pages).

* cited by examiner

Primary Examiner — Jewel V Dowtin
(74) Attorney, Agent, or Firm — Kilyk & Bowersox, PLLC

(57) ABSTRACT

To provide a clamp-on type ultrasonic flow sensor capable of highly accurately measuring a flow rate. First and second head cables CA1 and CA2 are connected between a head section 10 and an intermediate section 20. A relay cable CA3 is connected between the intermediate section 20 and a main body section 30. Ultrasonic elements are housed in casings 11c and 12c of the head section 10. A driving circuit for driving the ultrasonic elements and a signal processing section configured to perform signal processing on ultrasonic signals output from the ultrasonic elements are housed in a casing 20c of the intermediate section 20. In the intermediate section 20, a switching circuit configured to switch a connection state of the two ultrasonic elements of the head section 10 and the signal processing section is provided.

12 Claims, 8 Drawing Sheets

CLAMP-ON TYPE ULTRASONIC FLOW SENSOR

CROSS-REFERENCE TO RELATED APPLICATIONS

The present application claims foreign priority based on Japanese Patent Application No. 2018-047213, filed Mar. 14, 2018, the contents of which is incorporated herein by reference.

BACKGROUND OF THE INVENTION

1. Field of the Invention

The present invention relates to a clamp-on type ultrasonic flow sensor that detects a flow rate of fluid flowing in a pipe.

2. Description of Related Art

A flow sensor is used to measure a flow rate of fluid flowing in a pipe. As an example of the flow sensor, JP-A-2016-217733 (Patent Literature 1) describes an ultrasonic flow switch configured to be attachable to a pipe.

Specifically, in this ultrasonic flow switch, an upper clamp member and a lower clamp member are disposed to clamp the pipe and coupled using screws. A housing section that houses two ultrasonic elements is detachably fixed to the upper clamp member. In this state, an ultrasonic wave is transmitted from one ultrasonic element to the other ultrasonic element through fluid in the pipe. An ultrasonic wave is transmitted from the other ultrasonic element to one ultrasonic element through the fluid in the pipe.

The ultrasonic flow switch calculates a time difference between a time from a point in time when the ultrasonic wave is transmitted by one ultrasonic element until a point in time when the ultrasonic wave is received by the other ultrasonic element and a time from a point in time when the ultrasonic wave is transmitted by the other ultrasonic element until a point in time when the ultrasonic wave is received by one ultrasonic element. The ultrasonic flow switch calculates a flow rate of the fluid flowing in the pipe on the basis of the calculated time difference and a predetermined formula.

SUMMARY OF THE INVENTION

In the ultrasonic flow switch described above, an electronic circuit section is further housed in the housing section. The electronic circuit section includes a control board, a display board, an operation section, and a display lamp. When these components function as heat sources, measurement accuracy of a flow rate of the fluid is likely to be deteriorated because of heat generated from the heat sources.

The housing section is relatively easily increased in size because the housing section houses a large number of components. Therefore, when the housing section is attached to the pipe, it is necessary to secure a work space for attachment work for the housing section together with a setting space for the housing section. However, when the work space is limited, it is difficult to handle the housing section.

An object of the present invention is to provide a clamp-on type ultrasonic flow sensor capable of highly accurately measuring a flow rate and having improved handleability during attachment to a pipe.

(1) A clamp-on type ultrasonic flow sensor according to the present invention is a clamp-on type ultrasonic flow sensor that measures a flow rate of fluid flowing in a pipe, the clamp-on type ultrasonic flow sensor including: a driving circuit configured to generate first and second driving signals; a first ultrasonic element capable of transmitting an ultrasonic wave in response to the first driving signal and capable of receiving an ultrasonic wave; a second ultrasonic element capable of transmitting an ultrasonic wave in response to the second driving signal and capable of receiving an ultrasonic wave; a signal processing section configured to perform predetermined signal processing on ultrasonic signals output from the first and second ultrasonic elements; a switching section configured to perform switching of a first state in which the second ultrasonic element and the signal processing section are connected and a second state in which the first ultrasonic element and the signal processing section are connected; an information generating section configured to generate, as measurement information, information concerning a flow rate of the fluid in the pipe on the basis of the ultrasonic signals after the signal processing by the signal processing section; a flow-rate calculating section configured to calculate a flow rate value on the basis of the measurement information generated by the information generating section; a condition setting section for setting an output condition of a flow rate value that should be output to an outside of the clamp-on type ultrasonic flow sensor; an output section configured to output the flow rate value calculated by the flow-rate calculating section to the outside of the clamp-on type ultrasonic flow sensor according to the output condition; a head housing configured to house the first ultrasonic element; an intermediate housing configured to house the driving circuit, the signal processing section, the switching section, and the information generating section; a main body housing configured to house the condition setting section and the output section; a first cable connected between the head housing and the intermediate housing and configured to transmit the first driving signal and the ultrasonic signal output from the first ultrasonic element; and a second cable connected between the intermediate housing and the main body housing and configured to transmit the measurement information generated by the information generating section or the flow rate value calculated by the flow-rate calculating section.

In the clamp-on type ultrasonic flow sensor, the first and second driving signals respectively corresponding to the first and second ultrasonic elements are generated by the driving circuit. The ultrasonic wave transmitted from the first ultrasonic element in response to the first driving signal is received by the second ultrasonic element through the fluid in the pipe. The ultrasonic signal is output from the second ultrasonic element. The ultrasonic wave transmitted from the second ultrasonic element in response to the second driving signal is received by the first ultrasonic element through the fluid in the pipe. The ultrasonic signal is output from the first ultrasonic element. The predetermined signal processing is performed on the ultrasonic signals output from the first and second ultrasonic elements. The measurement information is generated on the basis of the ultrasonic signals after the signal processing. The flow rate value is calculated on the basis of the measurement information. The calculated flow rate value is output to the outside according to the set output condition.

In the configuration described above, the first cable is connected between the head housing and the intermediate housing. In this case, the intermediate housing can be disposed in a position separated from the pipe in a state in which the head housing is attached to the pipe such that the ultrasonic wave is transmitted between the first ultrasonic element and the pipe. Consequently, even when the driving circuit and the signal processing section respectively function as heat sources, heat generated from the driving circuit and the signal processing section is prevented from being transferred to a measurement target portion of the pipe. Therefore, deterioration in measurement accuracy due to a rise in the temperature of the fluid in the pipe is prevented.

In the configuration described above, the signal processing section is used in common for the first and second ultrasonic elements by the switching section. Consequently, it is unnecessary to provide two signal processing sections respectively corresponding to the first and second ultrasonic elements. Therefore, deterioration in measurement accuracy due to fluctuation in an operation characteristic that occurs among a plurality of signal processing sections does not occur.

The first cable is connected between the head housing and the intermediate housing and the second cable is connected between the intermediate housing and the main body housing. In this case, it is possible to reduce the length of the first cable compared with when the components housed in the intermediate housing are housed in the main body housing and only the first cable is connected between the head housing and the main body housing. Consequently, attenuation of the ultrasonic signal before the signal processing transmitted to the signal processing section through the first cable is reduced. Further, the influence of disturbance on the ultrasonic signal transmitted through the first cable is reduced.

Since the driving circuit and the signal processing section are not provided in the head housing, it is possible to reduce the head housing in size. Therefore, even when the work space is limited, it is possible to relatively easily attach the head housing to the pipe.

As a result, a clamp-on type ultrasonic flow sensor capable of highly accurately measuring a flow rate and having improved handleability during attachment to a pipe is realized.

(2) The ultrasonic signals output from the first and second ultrasonic elements may have an analog signal format. The signal processing section may include an analog/digital converter configured to perform, as the signal processing, analog/digital conversion processing on the ultrasonic signals output from the first and second ultrasonic elements.

As explained above, in the clamp-on type ultrasonic flow sensor, it is possible to reduce the length of the first cable compared with when the components housed in the intermediate housing are housed in the main body housing and only the first cable is connected between the head housing and the main body housing. Consequently, attenuation of the ultrasonic signals of the analog format transmitted through the first cable is reduced. On the other hand, in the intermediate housing, it is possible to generate measurement information of a digital format on the basis of ultrasonic signals of the digital format. Therefore, the influence of disturbance on data of the measurement information is reduced by transmitting the measurement information in a digital signal format.

(3) The signal processing section may include an amplifier circuit configured to perform, as the signal processing, amplification processing on the ultrasonic signals output from the first and second ultrasonic elements.

In this case, since the amplifier circuit is housed in the intermediate housing, it is possible to reduce the head housing in size.

(4) The clamp-on type ultrasonic flow sensor may further include a correction storing section configured to store correction information for correcting a predetermined relation between the measurement information and a flow rate of the fluid in the pipe. The flow-rate calculating section may calculate a flow rate value on the basis of the measurement information generated by the information generating section and the correction information stored in the correction storing section. The intermediate housing may further house the correction storing section.

In this case, it is possible to highly accurately calculate the flow rate value on the basis of the measurement information and the correction information. Since the correction storing section is stored in the intermediate housing, an increase in the size of the head housing is prevented.

(5) The clamp-on type ultrasonic flow sensor may further include a communication circuit configured to cause the second cable to transmit the measurement information generated by the information generating section or the flow rate value calculated by the flow-rate calculating section. The intermediate housing may further house the communication circuit.

In this case, the measurement information or the flow rate value is smoothly transmitted between the intermediate housing and the main body housing through the second cable.

(6) The clamp-on type ultrasonic flow sensor may further include: a first power supply circuit configured to supply electric power to the driving circuit, the signal processing section, the switching section, and the information generating section; and a second power supply circuit configured to supply electric power to the condition setting section, the output section, and the first power supply circuit. The intermediate housing may further house the first power supply circuit. The main body housing may further house the second power supply circuit. The second cable may be configured to further transmit electric power.

In this case, the electric power is supplied from the second power supply circuit to the condition setting section and the output section. The electric power is supplied to the first power supply circuit through the second cable. The electric power is supplied from the first power supply circuit to the driving circuit, the signal processing section, the switching section, and the information generating section. Consequently, it is unnecessary to provide a battery in the intermediate housing. Therefore, replacement work of the battery is unnecessary.

(7) The intermediate housing may have an elongated shape extending in one direction. The first cable may be connected to one end of the intermediate housing. The second cable may be connected to another end of the intermediate housing.

In this case, since the intermediate housing has the elongated shape, the intermediate housing can be treated as a pseudo cable that connects the first cable and the second cable.

(8) The intermediate housing may be configured to be supportable in a state in which the intermediate housing is suspended from any fixing member by at least one cable of the first and second cables.

In this case, the intermediate housing can be treated as a more pseudo cable that connects the first cable and the second cable.

(9) The clamp-on type ultrasonic flow sensor may further include: a display lamp attached to the head housing; a display-lamp driving circuit configured to generate a third driving signal for driving the display lamp; and a display-lamp control section configured to control the display-lamp driving circuit on the basis of a flow rate value corresponding to the measurement information generated by the information generating section. The intermediate housing may further house the display-lamp driving circuit and the display-lamp control section. The first cable may further transmit the third driving signal.

In this case, the user can easily grasp a state of the fluid in the pipe by visually recognizing the display lamp of the head housing. Since the display-lamp driving circuit and the display-lamp control section are housed in the intermediate housing, an increase in the size of the head housing is prevented.

(10) The head housing may include: a first head housing configured to store the first ultrasonic element; and a second head housing configured to house the second ultrasonic element. The first cable may include: a first head cable connected between the first head housing and the intermediate housing to transmit the first driving signal and the ultrasonic signal output from the first ultrasonic element; and a second head cable connected between the second head housing and the intermediate housing to transmit the second driving signal and the ultrasonic signal output from the second ultrasonic element.

In this case, the first head housing and the second head housing can be individually treated. Therefore, it is possible to individually perform attachment work of the first head housing to the pipe and attachment work of the second head housing to the pipe. Therefore, it is more easily perform the attachment work of the first and second housings to the pipe.

(11) The information generating section may generate, as the measurement information, a difference between a propagation time of the ultrasonic wave transmitted from the first ultrasonic element to the second ultrasonic element through the fluid and a propagation time of the ultrasonic wave transmitted from the second ultrasonic element to the first ultrasonic element.

In this case, it is possible to calculate a flow rate value of the fluid flowing in the pipe on the basis of the difference between the two propagation times.

(12) An attachment hole for attaching the intermediate housing to any fixing member may be formed in the intermediate housing.

In this case, it is possible to more easily attach the intermediate housing to any fixing member.

According to the present invention, it is possible to highly accurately measure a flow rate. Handleability of the clamp-on type ultrasonic flow sensor during attachment to the pipe is improved.

DESCRIPTION OF EMBODIMENTS

[1] Schematic Configuration of a Clamp-on Type Ultrasonic Flow Sensor

Figure 1:
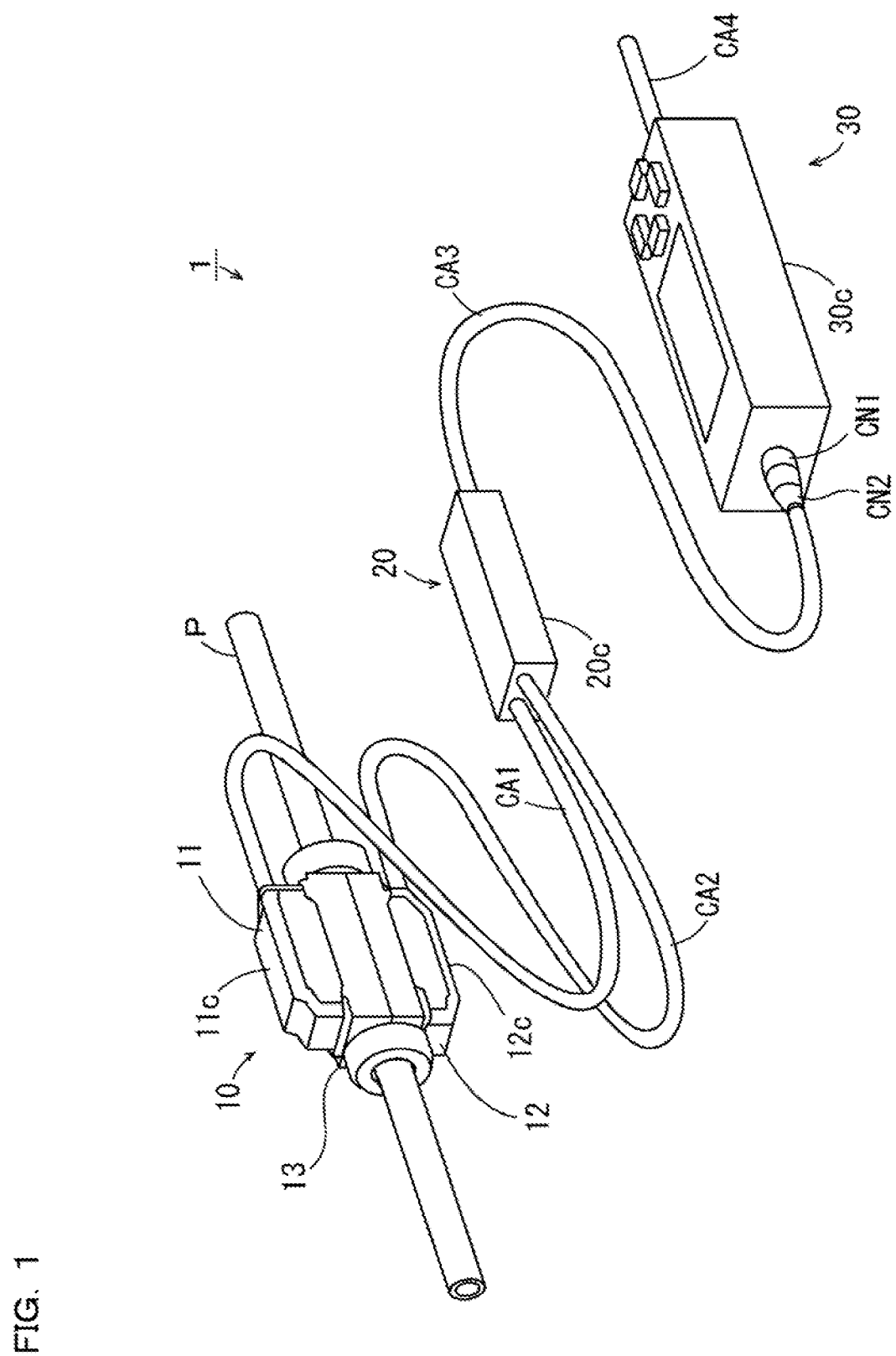
FIG. 1 is an exterior perspective view of a flow sensor according to an embodiment of the present invention.

A clamp-on type ultrasonic flow sensor (hereinafter abbreviated as flow sensor) according to an embodiment of the present invention is explained with reference to the drawings. FIG. 1 is an exterior perspective view of the flow sensor according to the embodiment of the present invention. As shown in FIG. 1, a flow sensor 1 according to this embodiment is configured mainly from a head section 10, an intermediate section 20, and a main body section 30.

The head section 10 includes a first head section 11, a second head section 12, and a head fixing mechanism 13. The first head section 11 and the second head section 12 respectively include casings 11c and 12c. The first head section 11 and the second head section 12 are attached to the outer circumferential surface of a pipe P in a state in which the casings 11c and 12c are held by the head fixing mechanism 13. In this embodiment, the pipe P is a relatively small resin pipe and has a diameter (an outer diameter) of, for example, 2 mm or more and 20 mm or less. Fluid flows in the pipe P.

A first head cable CA1 is connected between the first head section 11 and the intermediate section 20. A second head cable CA2 is connected between the second head section 12 and the intermediate section 20. A relay cable CA3 is connected between the intermediate section 20 and the main body section 30. The intermediate section 20 and the main body section 30 respectively include casings 20c and 30c. Connectors CN1 and CN2 are respectively provided in the casing 30c of the main body section 30 and the relay cable CA3. The connectors CN1 and CN2 are configured to be attachable to and detachable from each other. One end of a main body cable CA4 is further connected to the main body section 30. The other end of the main body cable CA4 is connected to an external apparatus (not shown in FIG. 1) of the flow sensor 1. The external apparatus is, for example, a personal computer or a programmable logic controller.

Figure 2:
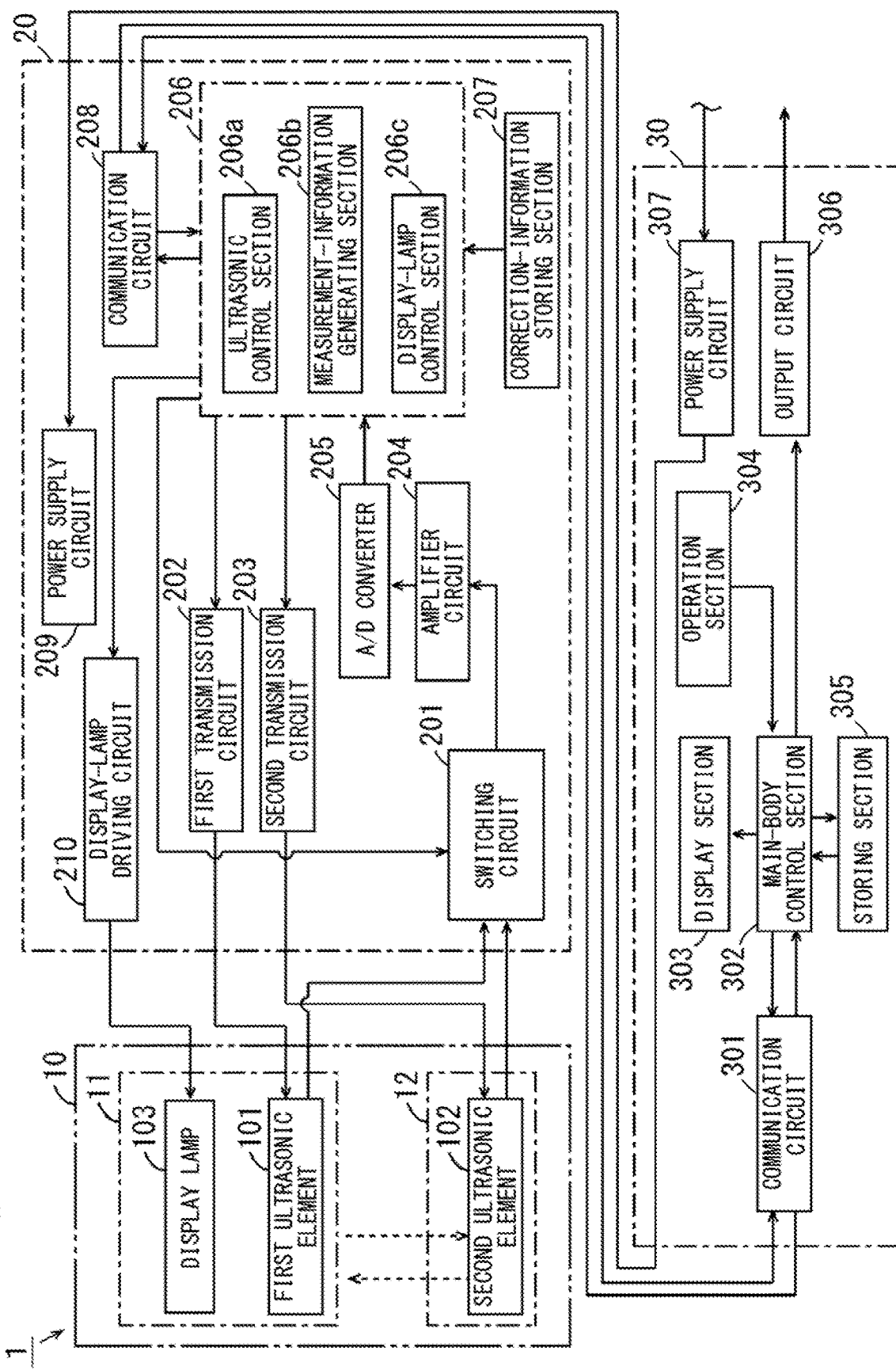
FIG. 2 is a block diagram showing the configuration of an electric system of the flow sensor shown in FIG. 1.

FIG. 2 is a block diagram showing the configuration of an electric system of the flow sensor 1 shown in FIG. 1. As shown in FIG. 2, in the head section 10, the first head section 11 includes a first ultrasonic element 101 and a display lamp 103 and the second head section 12 includes a second ultrasonic element 102.

The first ultrasonic element 101 of the first head section 11 is housed in the casing 11c shown in FIG. 1. The first ultrasonic element 101 transmits an ultrasonic wave in response to a first driving signal generated by a first transmission circuit 202 explained below. The first ultrasonic element 101 receives an ultrasonic wave and outputs an ultrasonic signal of an analog format corresponding to the received ultrasonic wave.

On the other hand, the second ultrasonic element 102 of the second head section 12 is housed in the casing 12c shown in FIG. 1. The second ultrasonic element 102 transmits an ultrasonic wave in response to a second driving signal generated by a second transmission circuit 203 explained below. The second ultrasonic element 102 receives an ultrasonic wave and outputs an ultrasonic signal of an analog format corresponding to the received ultrasonic wave. The display lamp 103 is housed in the casing 11c shown in FIG. 1 together with the first ultrasonic element 101. The display lamp 103 includes, for example, a plurality of light emitting diodes that emit lights indifferent colors. The display lamp 103 is lit or flashed in a plurality of kinds of forms in response to a third driving signal generated by a display-lamp driving circuit 210 explained below.

The intermediate section 20 includes a switching circuit 201, a first transmission circuit 202, a second transmission circuit 203, an amplifier circuit 204, an A/D (analog/digital) converter 205, a relay control section 206, a correction-information storing section 207, a communication circuit 208, a power supply circuit 209, and a display-lamp driving circuit 210. These components are housed in the casing 20c shown in FIG. 1.

The switching circuit 201 is connected to the first ultrasonic element 101 via the first head cable CA1 shown in FIG. 1 and connected to the second ultrasonic element 102 via the second head cable CA2 shown in FIG. 1. In the intermediate section 20, the switching circuit 201 is connected to the amplifier circuit 204. The switching circuit 201 switches a connection state of the first and second ultrasonic elements 101 and 102 and the amplifier circuit 204 between a first state and a second state on the basis of control by the relay control section 206.

The first state is a state in which the second ultrasonic element 102 and the amplifier circuit 204 are connected and the first ultrasonic element 101 and the amplifier circuit 204 are not connected. In the first state, the second ultrasonic element 102 receives an ultrasonic wave, whereby an ultrasonic signal output from the second ultrasonic element 102 is given to the amplifier circuit 204.

The second state is a state in which the first ultrasonic element 101 and the amplifier circuit 204 are connected and the second ultrasonic element 102 and the amplifier circuit 204 are not connected. In the second state, the first ultrasonic element 101 receives an ultrasonic wave, whereby an ultrasonic signal output from the first ultrasonic element 101 is given to the amplifier circuit 204.

Each of the first transmission circuit 202 and the second transmission circuit 203 includes a tristate driver. In the first transmission circuit 202, an output state of the tristate driver is switched among three states (an H level state, an L level state, and a high impedance state) on the basis of the control by the relay control section 206. Consequently, the first driving signal is generated. In the second transmission circuit 203, an output state of the tristate driver is switched among the three states on the basis of the control by the relay control section 206. Consequently, the second driving signal is generated.

In predetermined signal processing, the amplifier circuit 204 amplifies, with a predetermined gain, an ultrasonic signal given from the first transmission circuit 202 or the second transmission circuit 203. The amplifier circuit 204 gives the ultrasonic signal after the signal processing to the A/D converter 205. The A/D converter 205 performs A/D conversion processing of the given ultrasonic signal as predetermined signal processing. The A/D converter 205 gives an ultrasonic signal of a digital format after the signal processing to the relay control section 206.

The relay control section 206 is configured by, for example, an FPGA (Field-Programmable Gate Array) or a CPU (Central Processing Unit) and a memory. The relay control section 206 includes an ultrasonic control section 206a, a measurement-information generating section 206b, and a display-lamp control section 206c as functional sections. When the relay control section 206 is configured by the CPU and the memory, these functional sections are realized by the CPU executing a computer program stored in the memory. A part of the ultrasonic control section 206a, the measurement-information generating section 206b, and the display-lamp control section 206c may be realized by an electronic circuit (hardware) such as an FPGA. The remaining part may be realized by the CPU executing the computer program.

The ultrasonic control section 206a controls the switching circuit 201, the first transmission circuit 202, and the second transmission circuit 203 in response to a transmission control signal explained below transmitted from the main body section 30. For example, the ultrasonic control section 206a shifts the connection state between the first and second ultrasonic elements 101 and 102 and the amplifier circuit 204 to the first state and, at the same time, operates the first transmission circuit 202 to generate the first driving signal. In this case, an ultrasonic wave is transmitted from the first ultrasonic element 101. The transmitted ultrasonic wave is received by the second ultrasonic element 102 through the pipe P shown in FIG. 1 and the fluid in the pipe P. Consequently, an ultrasonic signal output from the second ultrasonic element 102 is given to the relay control section 206 while being processed by the amplifier circuit 204 and the A/D converter 205.

The ultrasonic control section 206a shifts the connection state between the first and second ultrasonic elements 101 and 102 and the amplifier circuit 204 to the second state and, at the same time, operates the second transmission circuit 203 to generate the second driving signal. In this case, an ultrasonic wave is transmitted from the second ultrasonic element 102. The transmitted ultrasonic wave is received by the first ultrasonic element 101 through the pipe P shown in FIG. 1 and the fluid in the pipe P. Consequently, an ultrasonic signal output from the first ultrasonic element 101 is given to the relay control section 206 while being processed by the amplifier circuit 204 and the A/D converter 205.

The measurement-information generating section 206b generates, on the basis of the ultrasonic signals output from the first and second ultrasonic elements 101 and 102, as measurement information, a difference between a propagation time of the ultrasonic wave transmitted from the first ultrasonic element 101 to the second ultrasonic element 102 and a propagation time of the ultrasonic wave transmitted from the second ultrasonic element 102 to the first ultrasonic element 101 (hereinafter referred to as time difference). Specifically, the measurement-information generating section 206b calculates the time difference from a peak of a cross-correlation function of signal waveforms of the given two ultrasonic signals.

The measurement-information generating section 206b may respectively measure a time until the ultrasonic wave transmitted from the first ultrasonic element 101 is received by the second ultrasonic element 102 and a time until the ultrasonic wave transmitted from the second ultrasonic element 102 is received by the first ultrasonic element 101 and calculate a difference between the times as the time difference.

The display-lamp control section 206c controls the display-lamp driving circuit 210 in response to a display control signal explained below transmitted from the main body section 30. The display-lamp driving circuit 210 is connected to the display lamp 103 via the first head cable CA1 shown in FIG. 1. The display-lamp driving circuit 210 generates the third driving signal for driving the display lamp 103 on the basis of the control by the display-lamp control section 206c.

The correction-information storing section 207 is configured by, for example, a nonvolatile memory. The correction-information storing section 207 stores correction information for correcting a predetermined relation between the measurement information generated by the measurement-information generating section 206b and a flow rate of the fluid in the pipe P. Details of the correction information are explained below.

The communication circuit 208 is connected to one end of the relay cable CA3 shown in FIG. 1. The communication circuit 208 outputs measurement information of a digital format generated by the measurement-information generating section 206b and the correction information to the main body section 30 through the relay cable CA3. The communication circuit 208 gives a transmission control signal and a display control signal input from the main body section 30 through the relay cable CA3 to the relay control section 206. The transmission control signal is a control signal for controlling the first transmission circuit 202 and the second transmission circuit 203. The display control signal is a control signal for controlling the display-lamp driving circuit 210.

The power supply circuit 209 receives electric power supplied from the main body section 30 through the relay cable CA3 and supplies the received electric power to the other components provided in the intermediate section 20.

The main body section 30 includes a communication circuit 301, a main-body control section 302, a display section 303, an operation section 304, a storing section 305, an output circuit 306, and a power supply circuit 307. These components are housed in the casing 30c shown in FIG. 1. The communication circuit 301 is connected to the other end of the relay cable CA3 shown in FIG. 1 via the connectors CN1 and CN2. The communication circuit 301 gives the measurement information and the correction information output from the intermediate section 20 through the relay cable CA3 to the main-body control section 302. The communication circuit 301 outputs a transmission control signal and a display control signal generated in the main-body control section 302 as explained below to the intermediate section 20 through the relay cable CA3.

The display section 303 includes, for example, a segment display or a dot matrix display and displays, for example, a flow rate of the fluid flowing in the pipe P on the basis of the control by the main-body control section 302. The operation section 304 includes a plurality of operation buttons. A user can input various kinds of information used for measurement of a flow rate by operating the operation section 304. The various kinds of information used for measurement of a flow rate include the material of the pipe P to which the head section 10 is attached, the inner diameter of the pipe P, the outer diameter of the pipe P, velocity of an ultrasonic wave in the fluid, an incident angle of the ultrasonic wave on the fluid, and a flow rate correction coefficient explained below. The user can input, by operating the operation section 304, an output condition of a flow rate value that should be output to the outside of the flow sensor 1. The storing section 305 is configured by a nonvolatile memory or a hard disk drive.

The main-body control section 302 includes, for example, a CPU and a memory and generates a transmission control signal and a display control signal that should be given to the intermediate section 20 in order to respectively drive the first ultrasonic element 101, the second ultrasonic element 102, and the display lamp 103. The main-body control section 302 performs setting of various kinds of information input by the operation section 304. Specifically, the main-body control section 302 causes the storing section 305 to store the various kinds of information input by the operation section 304. Further, the main-body control section 302 calculates a flow rate of the fluid flowing in the pipe P on the basis of the measurement information and the correction information given from the communication circuit 301 and various kinds of information set in advance. The main-body control section 302 outputs the calculated flow rate (a flow rate value) according to an output condition set in advance.

In the main body section 30, the user can input a correction value and the like concerning the measurement of a flow rate by operating the operation section 304. In this case, the main-body control section 302 can correct a calculation result of the flow rate on the basis of the input information.

The output circuit 306 is connected to one end of the main body cable CA4 shown in FIG. 1. The output circuit 306 outputs the flow rate value output from the main-body control section 302 to the external apparatus of the flow sensor 1 through the main body cable CA4.

The power supply circuit 307 receives electric power supplied from a commercial power supply through a not-shown power supply cable and supplies a part of the received electric power to the other components provided in the main body section 30. The power supply circuit 307 supplies the remainder of the received electric power to the power supply circuit 209 of the intermediate section 20 through the relay cable CA3.

A threshold of a flow rate may be stored in the storing section 305 as the output condition. In this case, the main-body control section 302 may generate an ON/OFF signal on the basis of a comparison result of a calculated flow rate and a threshold of a flow rate set in advance. The ON/OFF signal is a signal for switching an ON state and an OFF state of the external apparatus connected to the main body section 30 through the main body cable CA4. The output circuit 306 outputs the generated ON/OFF signal to the external apparatus, whereby the flow sensor 1 functions as a flow switch. The communication circuit 301 may output the generated ON/OFF signal to the intermediate section 20 as a display control signal. In this case, in the intermediate section 20, the display-lamp control section 206c generates the third driving signal on the basis of the ON/OFF signal. Consequently, a display form of the display lamp 103 can be controlled in a form corresponding to the flow rate and the state of the external apparatus.

[2] Calculation Method for a Flow Rate

Figure 3:
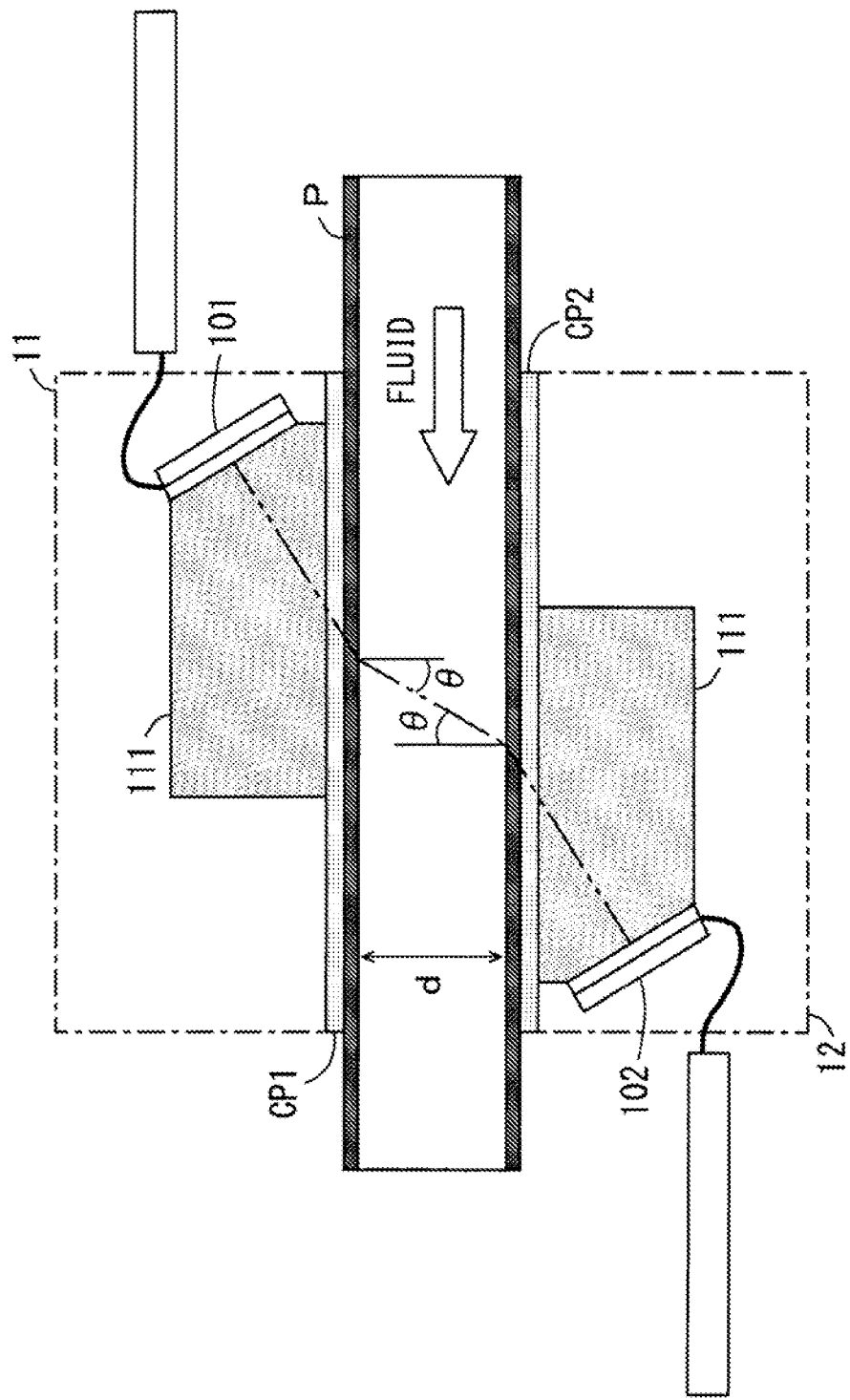
FIG. 3 is a schematic sectional view showing a first ultrasonic element, a second ultrasonic element, and peripheral members thereof for explaining a calculation method for a flow rate in the flow sensor shown in FIG. 1.

FIG. 3 is a schematic sectional view showing the first ultrasonic element 101, the second ultrasonic element 102, and peripheral members thereof for explaining a calculation method for a flow rate in the flow sensor 1 shown in FIG. 1.

As shown in FIG. 3, in the head section 10 shown in FIG. 1, a solid elastic couplant CP1 is provided to be in contact with a part of the outer circumferential surface of the pipe P. A solid elastic couplant CP2 is provided to be in contact with another portion of the outer circumferential surface of the pipe P. The elastic couplants CP1 and CP2 are formed of a soft elastic material made of solid polymeric rubber or a solid gel substance. The hardness of the elastic couplants CP1 and CP2 is, for example, 20 degrees to 40 degrees. The elastic couplants CP1 and CP2 are formed to surround the outer circumferential surface of the pipe P and are fixed while being pressed against the pipe P such that the inner circumferential surfaces thereof adhere to the outer circumferential surface of the pipe P.

The first head section 11 includes a wedge material 111 that transmits an ultrasonic wave. The first head section 11 is provided such that the wedge material 111 is in contact with the outer circumferential surface of the elastic couplant CP1. Like the first head section 11, the second head section 12 includes the wedge material 111 that transmits an ultrasonic wave. The second head section 12 is provided such that the wedge material 111 is in contact with the outer circumferential surface of the elastic couplant CP2. The wedge material 111 is formed of a non-metal material having high rigidity and high acoustic transparency. The wedge material 111 is desirably formed of a material having high environment resistance.

The elastic couplants CP1 and CP2 are disposed to be in contact with the wedge material 111 and the pipe P to thereby match acoustic impedances of the wedge material 111 and the pipe P.

The fluid flows in the pipe P in a state in which the first head section 11 and the second head section 12 are attached to the pipe P. Consequently, it is possible to transmit and receive an ultrasonic wave between the first ultrasonic element 101 and the second ultrasonic element 102. In the intermediate section 20 shown in FIG. 2, the various circuits are controlled such that an ultrasonic wave is transmitted from the first ultrasonic element 101 to the second ultrasonic element 102 and an ultrasonic signal output from the second ultrasonic element 102 is input to the amplifier circuit 204. The various circuits are controlled such that an ultrasonic wave is transmitted from the second ultrasonic element 102 to the first ultrasonic element 101 and an ultrasonic signal output from the first ultrasonic element 101 is input to the amplifier circuit 204. Thereafter, a time difference is calculated on the basis of the two ultrasonic signals.

Before measurement of a flow rate, at least the inner diameter of the pipe P, velocity of an ultrasonic wave in the fluid, an incident angle of the ultrasonic wave on the fluid, and a flow rate correction coefficient are set in the flow sensor 1. The flow rate correction coefficient is a coefficient for converting velocity of the fluid having a predetermined distribution in the cross section of the pipe P into average velocity.

In this case, the main-body control section 302 shown in FIG. 2 can theoretically calculate a flow rate Q of the fluid flowing in the pipe P on the basis of Expression (1) described below. In Expression (1), $\Delta t$ represents a time difference calculated in the intermediate section 20, d represents the inner diameter of the pipe P, $\theta$ represents an incident angle of the ultrasonic wave in the fluid, $V_s$ represents velocity of the ultrasonic wave in the fluid, and K represents the flow rate correction coefficient.

$$Q = (1/K) \cdot (\pi d V_s^2 / 8 \tan \theta) \cdot \Delta t \quad (1)$$

Incidentally, depending on operation characteristics of the components of the head section 10 and the intermediate section 20, the relation of Expression (1) is not satisfied between the time difference calculated in the intermediate section 20 and the flow rate of the fluid flowing in the pipe P.

Therefore, in this embodiment, Expression (1) is corrected using the correction information explained above in order to accurately acquire a peculiar relation between the time difference calculated by the head section 10 and the intermediate section 20 and a flow rate that should be actually measured. That is, the main-body control section 302 corrects, using the correction information, the above Expression (1) serving as a predetermined relation between the measurement information and the flow rate of the fluid. An actual flow rate is calculated on the basis of a formula (a relation between the time difference and the flow rate) obtained by the correction. In this way, the correction information is information for correcting Expression (1) according to the head section 10 and the intermediate section 20. In this case, the correction information includes, for example, a value for adjusting a coefficient of the time difference $\Delta t$ in Expression (1) and an offset value (an adjustment value with respect to a flow rate 0) that should be added to a term including the time difference $\Delta t$ in Expression (1).

Figure 4:
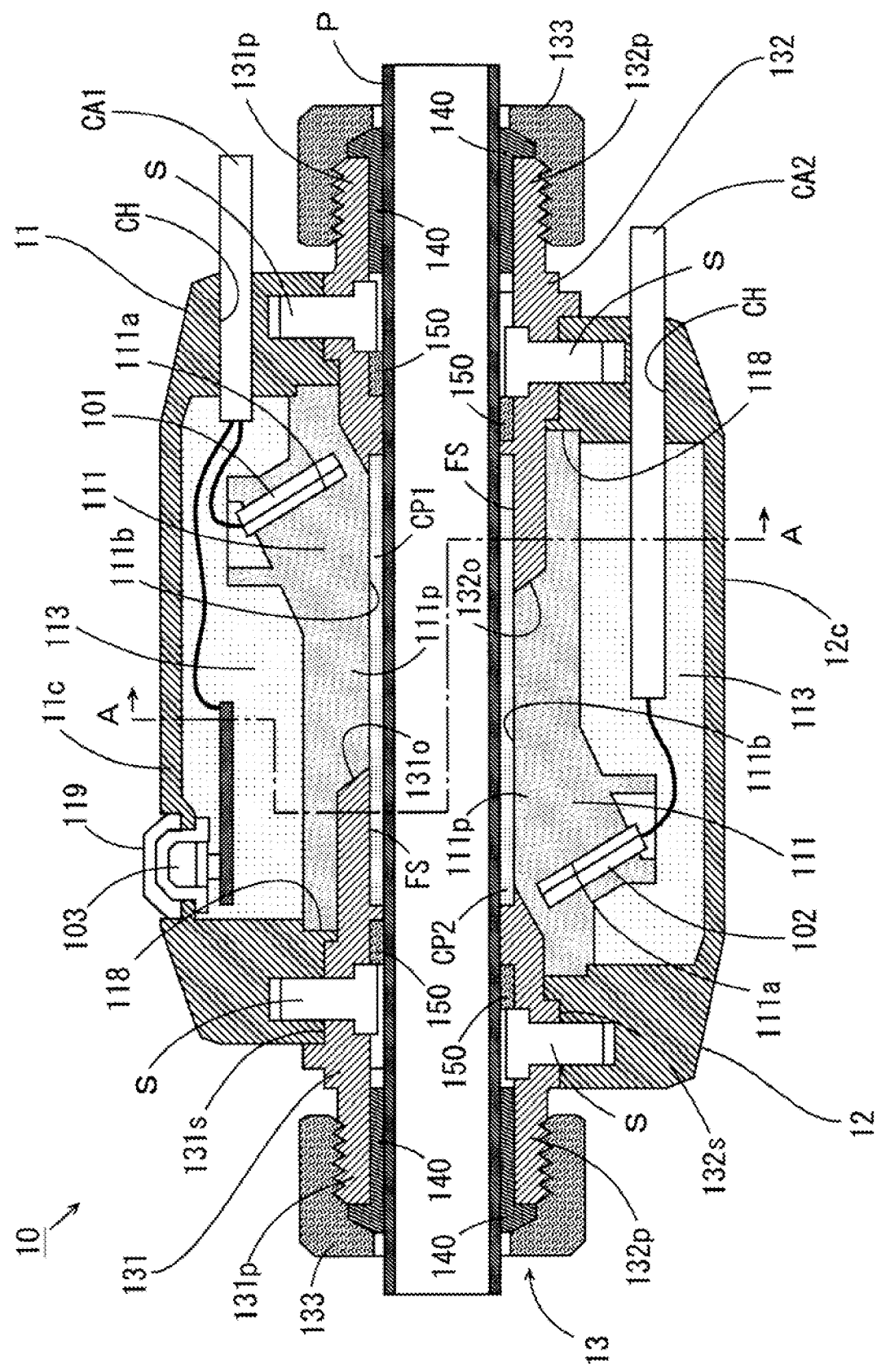
FIG. 4 is a sectional view of a head section shown in FIG. 1 parallel to the axis of a pipe.

[3] Specific Configuration of the Head Section 10 and an Attachment Example to the Pipe P FIG. 4 is a sectional view of the head section 10 shown in FIG. 1 parallel to the axis of the pipe P. The sectional view of FIG. 4 corresponds to the schematic sectional view of FIG. 3. As shown in FIG. 4, the first head section 11 includes the casing 11c, the first ultrasonic element 101, the display lamp 103, and the wedge material 111. The casing 11c is formed of resin and has an elongated shape (in this example, a substantially rectangular parallelepiped shape) extending in one direction.

In the members attached to the pipe P, a direction facing the axis of the pipe P (a direction approaching the axis of the pipe P) is referred to as inward direction and the opposite direction of the direction (a direction away from the axis of the pipe P) is referred to as outward direction.

A window section 119 formed by a transparent member is provided at the outer-side end portion of the casing 11c facing the outward direction. The transparent member is formed of, for example, resin. The display lamp 103 is disposed in a position near the window section 119 on the inside of the casing 11c. In this state, the display lamp 103 is visually recognizable by the user from the outside of the casing 11c through the window section 119.

An opening 118 that causes an internal space of the casing 11c and an external space of the casing 11c to communicate is formed at the inner-side end portion of the casing 11c facing the inward direction. The wedge material 111 is attached to the inner-side end portion of the casing 11c to close the opening 118. Consequently, a space into which liquid such as water and oil cannot intrude is formed on the inside of the casing 11c.

A joining surface 111a facing an oblique outward direction is formed in an outer-side portion of the wedge material 111. A projecting section 111p projecting to the inward direction from the inner-side end portion of the casing 11c in a closed state of the opening 118 is formed in an inner-side portion of the wedge material 111. A flat incident/emitting surface 111b facing the inward direction is formed at the distal end of the projecting section 111p.

A cable insertion hole CH is formed at one end portion in the longitudinal direction of the casing 11c. One end of the first head cable CA1 is inserted into the cable insertion hole CH. The first head cable CA1 has a configuration in which a shield cable and a non-shield cable are bound. More specifically, the shield cable configuring a part of the first head cable CA1 includes twisted pair core wires connected to the first ultrasonic element 101 and a shield layer covering the twisted pair core wires. On the other hand, the non-shield cable configuring another portion of the first head cable CA1 includes one or a plurality of core wires connected to the display lamp 103 and does not include a shield layer.

A resin member 113 is filled in the casing 11c such that an electric connection point of the first head cable CA1 and the first ultrasonic element 101 and an electric connection point of the first head cable CA1 and the display lamp 103 are embedded in the resin member 113. Consequently, the electric connection points of the first head cable CA1 and the first ultrasonic element 101 and the display lamp 103 are protected by the resin member 113. Consequently, deterioration of the connection points is prevented. Reliability of the flow sensor 1 is improved and extension of the life of the flow sensor 1 is realized.

The second head section 12 includes the casing 12c, the second ultrasonic element 102, and the wedge material 111. The second head section 12 has the same configuration as the configuration of the first head section 11 except that the second head section 12 does not include the display lamp 103, the window section 119 is not provided in the casing 12c, and the direction of the wedge material 111 attached to the casing 12c is opposite concerning the longitudinal direction of the casing 12c.

One end of the second head cable CA2 is inserted into the cable insertion hole CH of the casing 12c. The second head cable CA2 is configured by a shield cable. More specifically, the shield cable configuring the second head cable CA2 includes twisted pair core wires connected to the second ultrasonic element 102 and a shield layer covering the twisted pair core wires. As in the internal configuration of the first head section 11, the resin member 113 is filled in the casing 12c such that an electric connection point of the second head cable CA2 and the second ultrasonic element 102 is embedded in the resin member 113.

The head fixing mechanism 13 includes the clamp members 131 and 132, the elastic couplants CP1 and CP2, a plurality of (in this example, two) nut members 133, a plurality of (in this example, four) gland nut rubbers 140, and a plurality of (in this example, four) temporary fixing rubbers 150.

The clamp members 131 and 132 have the same shape and are formed of carbon reinforced resin. The elastic couplants CP1 and CP2, the two gland nut rubbers 140, and the two temporary fixing rubbers 150 are connected to the clamp members 131 and 132 in advance using, for example, an adhesive. The first and second head sections 11 and 12 are attached to the clamp members 131 and 132. Then, the clamp members 131 and 132 are coupled to clamp the pipe P. The clamp members 131 and 132 may be formed of normal resin not including a reinforcing agent.

Figure 5:
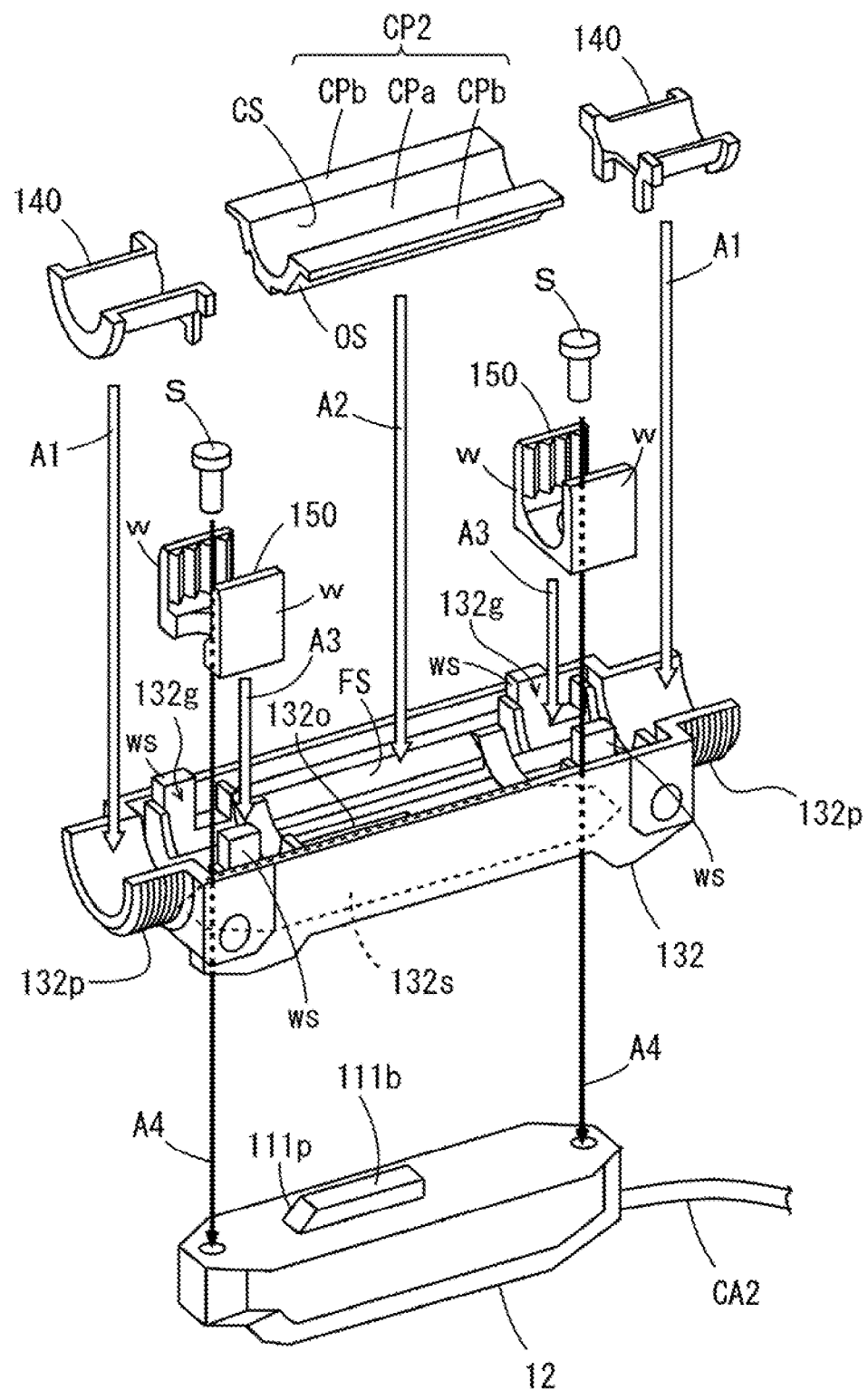
FIG. 5 is an exploded perspective view showing one clamp member of a head fixing mechanism shown in FIG. 4 and a plurality of members connected to the clamp member.

A connection state of the components in one clamp member 132 representing the clamp members 131 and 132 is explained. FIG. 5 is an exploded perspective view showing one clamp member 132 in the head fixing mechanism 13 shown in FIG. 4 and a plurality of members connected to the clamp member 132.

As shown in FIG. 5, the clamp member 132 has an elongated shape extending longer than the second head section 12. At both end portions of the clamp member 132, coupling sections 132p having a semi-cylindrical shape and extending in the longitudinal direction of the clamp member 132 are respectively formed. Threading is applied to the outer circumferential surfaces of the coupling sections 132p. As indicated by white arrows A1 in FIG. 5, the gland nut rubbers 140 having a substantially semi-cylindrical shape are attached on the inner circumferential surfaces of the coupling sections 132p.

The fixing inner surface FS facing the inward direction is formed in substantially the center of the clamp member 132. As indicated by a white arrow A2 in FIG. 5, the elastic couplant CP2 is attached on the fixing inner surface FS. The elastic couplant CP2 includes an ultrasonic-wave transmitting section CPa having a substantially semi-cylindrical shape and two flange sections CPb. The two flange sections CPb are formed to extend a fixed distance in directions away from each other from both end portions in the circumferential direction of the ultrasonic-wave transmitting section CPa. The ultrasonic-wave transmitting section CPa of the elastic couplant CP2 includes a contact surface CS and an outer surface OS. The contact surface CS is a surface in contact with the pipe P. The outer surface OS is a surface in contact with the fixing inner surface FS of the clamp member 132 and the wedge material 111 of the second head section 12.

An opening 132o for bringing the incident/emitting surface 111b of the second head section 12 into contact with a part of the outer surface OS of the elastic couplant CP2 is formed in a portion of the clamp member 132 forming the fixing inner surface FS.

Rubber fitting sections 132g are respectively formed in portions between the fixing inner surface FS and one coupling section 132p and between the fixing inner surface FS and the other coupling section 132p in the clamp member 132. Each of the rubber fitting sections 132g includes two supporting pieces ws formed to be opposed to each other at a fixed distance in the latitudinal direction of the clamp member 132. As indicated by a white arrow A3 in FIG. 5, the temporary fixing rubber 150 having a substantially U-shaped cross section is fit in between the two supporting pieces ws of the rubber fitting section 132g.

A holding surface 132s is formed in an outer side portion of the clamp member 132 facing the outward direction of the pipe P in a state in which the clamp member 132 is attached to the pipe P. In a state in which the second head section 12 is disposed on the holding surface 132s, as indicated by thick arrows A4 in FIG. 5, the clamp member 132 and the second head section 12 are connected using two screws S. At this time, the heads of the two screws S are located in the inward direction of the clamp member 132. The projecting section 111p of the second head section 12 is inserted into the opening 132o of the clamp member 132. The incident/emitting surface 111b of the second head section 12 is in contact with the outer surface OS of the elastic couplant CP2.

In this way, the second head section 12 is held by the clamp member 132. Consequently, a component including the second head section 12 and the clamp member 132 can be treated integrally with the pipe P.

Each of the temporary fixing rubbers 150 includes two wall sections w opposed to each other. In a state in which the temporary fixing rubber 150 is fit in the rubber fitting section 132g, the two wall sections w are supported by the two supporting pieces ws of the rubber fitting section 132g. At this time, an interval between the two wall sections w of the temporary fixing rubber 150 is slightly smaller than the outer diameter of the pipe P. Consequently, when the second head section 12 is attached to the pipe P, the pipe P can be easily inserted between the two wall sections w of each of the temporary fixing rubbers 150.

As explained above, the clamp member 131 has the same shape as the shape of the clamp member 132. Like the clamp member 132, the elastic couplant CP1, the two gland nut rubbers 140, and the two temporary fixing rubbers 150 are connected to the clamp member 131. A holding surface 131s (FIG. 4) is formed in the outer-side portion of the clamp member 131. In a state in which the first head section 11 is disposed on the holding surface 131s, the clamp member 131 and the first head section 11 are connected using the two screws S. Consequently, a component including the first head section 11 and the clamp member 131 can be treated integrally with the pipe P.

Thereafter, the clamp member 131 that holds the first head section 11 and the clamp member 132 that holds the second head section 12 are disposed to be opposed to each other across the pipe P. At this time, a coupling section 131p formed at one end portion of the clamp member 131 and the coupling section 132p formed at one end portion of the clamp member 132 form one male screw (hollow screw). The coupling section 131p formed at the other end portion of the clamp member 131 and the coupling section 132p formed at the other end portion of the clamp member 132 form one male screw (hollow screw). Thereafter, as shown in FIG. 4, the nut members 133 are fastened to the male screws formed by the coupling sections 131p and 132p disposed to be opposed to each other. Consequently, the clamp members 131 and 132 are coupled.

Each of the nut members 133 includes a first member and a second member formed of carbon reinforced resin. Each of the first member and the second member has a substantially semi-cylindrical shape. Threading is applied to the inner circumferential surface of each of the first member and the second member. The first member and the second member are configured to be connectable to each other to clamp the pipe P and detachable from each other. Consequently, it is possible to couple the clamp members 131 and 132 with a simple configuration without cutting the pipe P.

[4] Specific Configuration of the Intermediate Section 20 and a Setting Method for the Intermediate Section 20

Figure 6:
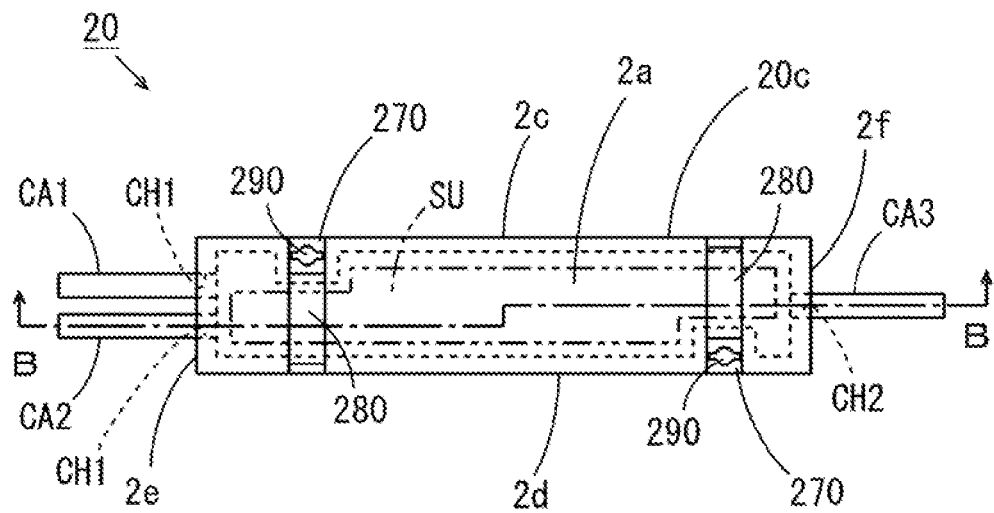
FIG. 6 is a plan view of an intermediate section shown in FIG. 1.
Figure 7:
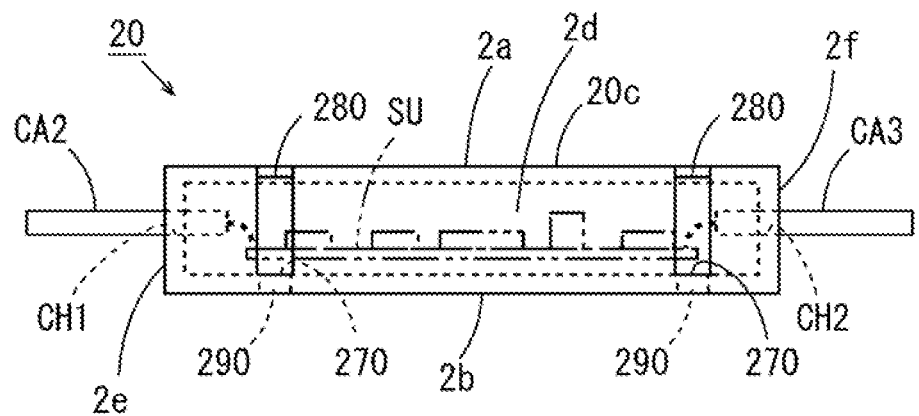
FIG. 7 is a side view of the intermediate section shown in FIG. 1.
Figure 8:
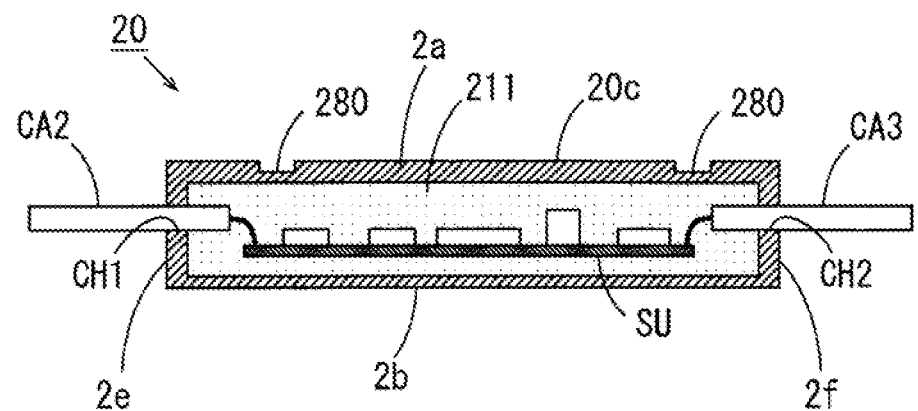
FIG. 8 is a B-B line sectional view of FIG. 6.

FIG. 6 is a plan view of the intermediate section 20 shown in FIG. 1. FIG. 7 is a side view of the intermediate section 20 shown in FIG. 1. FIG. 8 is a B-B line sectional view of FIG. 6. As shown in FIGS. 6 to 8, the casing 20c of the intermediate section 20 is formed of resin and has an elongated shape extending in one direction. Specifically, the casing 20c in this example has a substantially rectangular parallelepiped shape and includes an upper surface section 2a and a bottom surface section 2b opposed to each other, a one side surface section 2c and an other side surface section 2d opposed to each other, and a one end face section 2e and an other end face section 2f opposed to each other.

A substrate SU on which the switching circuit 201, the first transmission circuit 202, the second transmission circuit 203, the amplifier circuit 204, the A/D converter 205, the relay control section 206, the correction-information storing section 207, the communication circuit 208, the power supply circuit 209, and the display-lamp driving circuit 210 shown in FIG. 2 are mounted is housed in the casing 20c. In FIGS. 6 and 7, the substrate SU in the casing 20c is indicated by an alternate long and two short dashes line.

Two cable insertion holes CH1 are formed on the one end face section 2e of the casing 20c. The other ends of the first and second head cables CA1 and CA2 are respectively inserted into the cable insertion holes CH1. One cable insertion hole CH2 is formed on the other end face section 2f of the casing 20c. One end of the relay cable CA3 is inserted into the cable insertion hole CH2. The relay cable CA3 is a non-shield cable including a plurality of core wires connected to the substrate SU. The non-shield cable does not include a shield layer. Consequently, an increase in the weight of the relay cable CA3 is prevented and a reduction in cost is realized. A shield cable may be used as the relay cable CA3.

As shown in FIG. 8, a resin member 211 is filled in the casing 20c such that the substrate SU, an electric connection point of the first head cable CA1 and the substrate SU, an electric connection point of the second head cable CA2 and the substrate SU, and an electric connection point of the relay cable CA3 and the substrate SU are embedded in the resin member 211. Consequently, the substrate SU and the various components mounted on the substrate SU are protected by the resin member 211. The connection points of the substrate SU and the cables are protected by the resin member 113. Therefore, deterioration of the various components mounted on the substrate SU and connection points of wiring circuits on the substrate SU is prevented. Reliability of the flow sensor 1 is improved and extension of the life of the flow sensor 1 is realized.

As explained above, in the intermediate section 20, the first head cable CA1 and the second head cable CA2 are connected to one end of the casing 20c having the elongated shape. The relay cable CA3 is connected to the other end of the casing 20c. With such a configuration, the intermediate section 20 can be treated as a pseudo cable.

As shown in FIG. 6, attachment grooves 280 having a fixed width are respectively formed near both end portions in the longitudinal direction of the casing 20c. The attachment grooves 280 are formed to extend upward from near the lower end portion of the one side surface section 2c of the casing 20c, traverse the upper surface section 2a, and extend to near the lower end portion of the other side surface section 2d.

Near one end portion of the casing 20c, a fixing section 270 is formed in a portion located below the attachment groove 280 in the one side surface section 2c. Near the other end portion of the casing 20c, the fixing section 270 is formed in a portion located below the attachment groove 280 in the other side surface section 2d. Attachment holes 290 vertically piercing through the fixing sections 270 are formed in the fixing sections 270.

Figure 9:
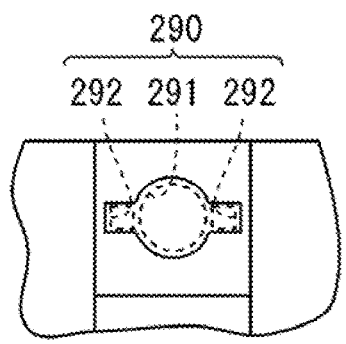
FIG. 9 is an enlarged plan view of an attachment hole shown in FIG. 6.

FIG. 9 is an enlarged plan view of the attachment hole 290 shown in FIG. 6. As shown in FIG. 9, the attachment hole 290 is configured from a circular hole section 291 and two rectangular groove sections 292. The two rectangular groove sections 292 are formed by cutting off portions opposed to each other of the inner circumferential surface of the circular hole section 291. Consequently, the attachment hole 290 can be used as a round hole into which a member circular in cross section can be inserted and can be used as a long hole into which a member rectangular in cross section can be inserted.

Figure 10:
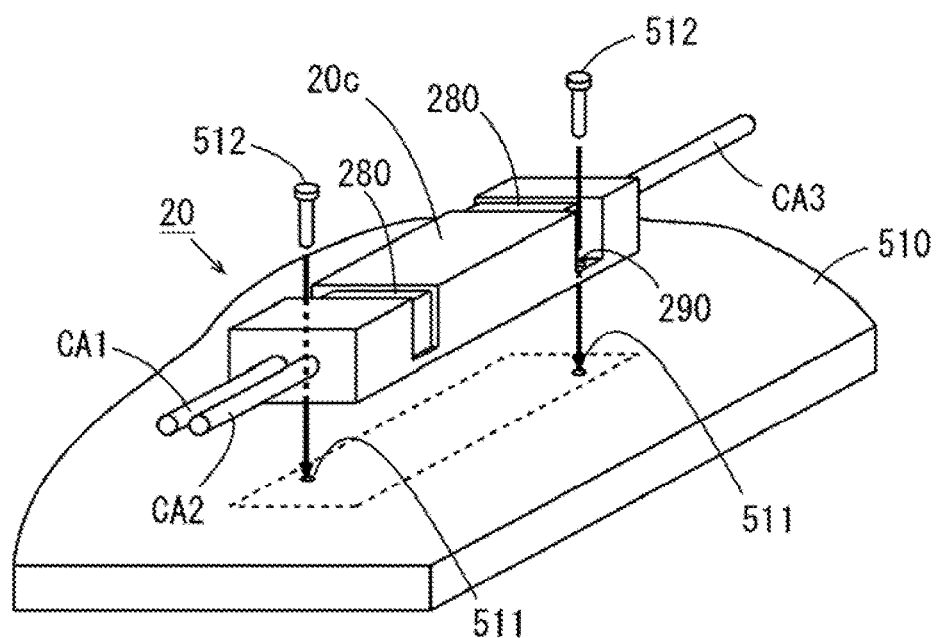
FIG. 10 is an exterior perspective view showing an example of a setting method for the intermediate section.

The intermediate section 20 is attached to, for example, a fixing member fixedly provided in advance in a factory. FIG. 10 is an exterior perspective view showing an example of a setting method for the intermediate section 20. In the example shown in FIG. 10, the intermediate section 20 is attached, using two screws 512, on a supporting table 510 provided for setting of the intermediate section 20 as a fixing member.

Specifically, as indicated by a dotted line in FIG. 10, a setting region for attaching the intermediate section 20 is set in advance on the supporting table 510 in this example. On the inner side of the setting region, two screw holes 511 respectively corresponding to the two attachment holes 290 are formed. The intermediate section 20 is disposed on the setting region of the supporting table 510. The two screws 512 are respectively attached to the two screw holes 511 of the supporting table 510 through the two attachment holes 290 of the casing 20c. Consequently, the intermediate section 20 is fixed to the supporting table 510. In this case, the attachment holes 290 are used as round holes corresponding to the screws 512.

Figure 11:
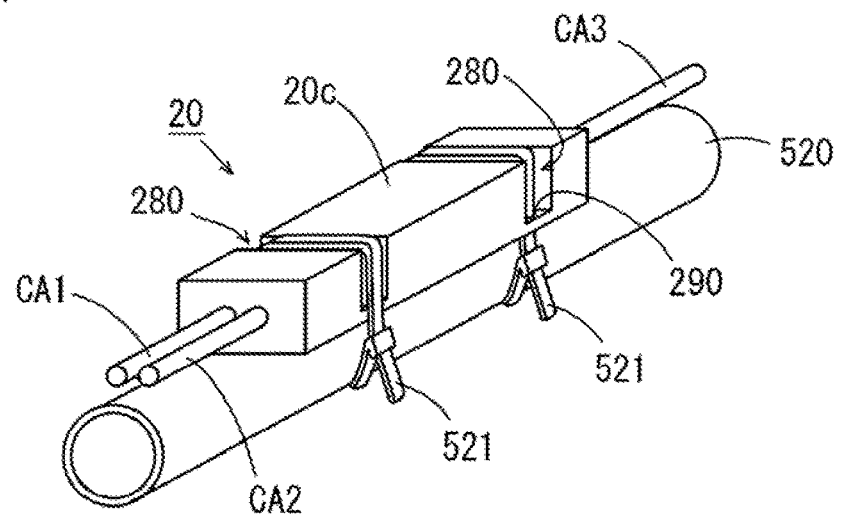
FIG. 11 is an exterior perspective view showing another example of the setting method for the intermediate section.

FIG. 11 is an exterior perspective view showing another example of the setting method for the intermediate section 20. In the example shown in FIG. 11, the intermediate section 20 is attached, using two binding bands 521, on a supporting tube 520 provided for setting of the intermediate section 20 as a fixing member.

Specifically, the two binding bands 521 are respectively inserted into the two attachment holes 290 of the casing 20c. In this state, the binding bands 521 are wound in the circumferential direction of the supporting tube 520 to bundle the casing 20c and the supporting tube 520. The binding bands 521 are tightened. In this case, the attachment holes 290 are used as long holes corresponding to the binding bands 521.

When the binding bands 521 are tightened, parts of the binding bands 521 are fit in the attachment grooves 280 formed in the casing 20c. Consequently, tightening work of the binding bands 521 is stabilized. A fixing state of the intermediate section 20 on the supporting tube 520 is stabilized.

Figure 12:
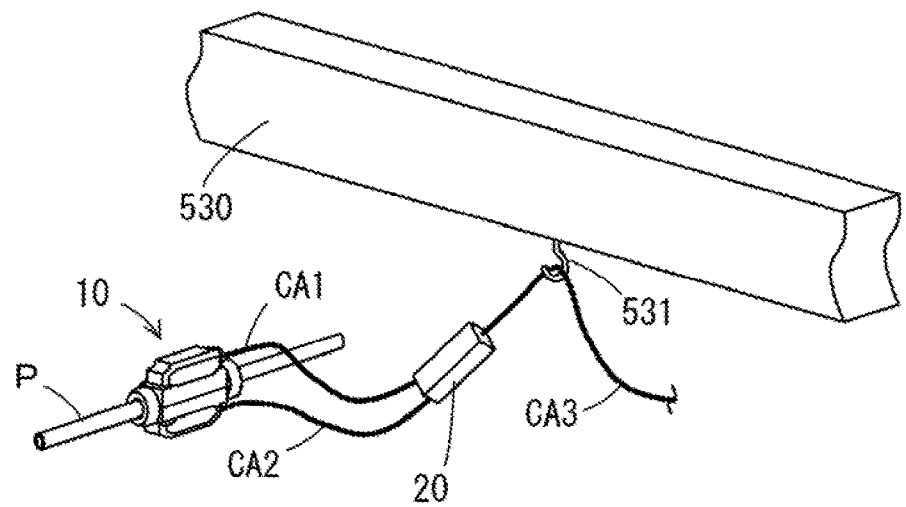
FIG. 12 is an exterior perspective view showing still another example of the setting method for the intermediate section.

FIG. 12 is an exterior perspective view showing still another example of the setting method for the intermediate section 20. In the example shown in FIG. 12, the intermediate section 20 is suspended by the relay cable CA3 from a beam 530 provided in a factory as a fixing member. Specifically, the relay cable CA3 extending from the intermediate section 20 is hung on a hook 531 attached to the beam 530. In this case, the intermediate section 20 can be treated as a more pseudo cable that connects the first and second head cables CA1 and CA2 and the relay cable CA3.

The intermediate section 20 may be suspended from the beam 530 by at least one of the first head cable CA1 and the second head cable CA2 instead of the relay cable CA3. That is, at least one of the first head cable CA1 and the second head cable CA2 extending from the intermediate section 20 may be hung on the hook 531 attached to the beam 530.

[5] Extension Cable

Figure 13:
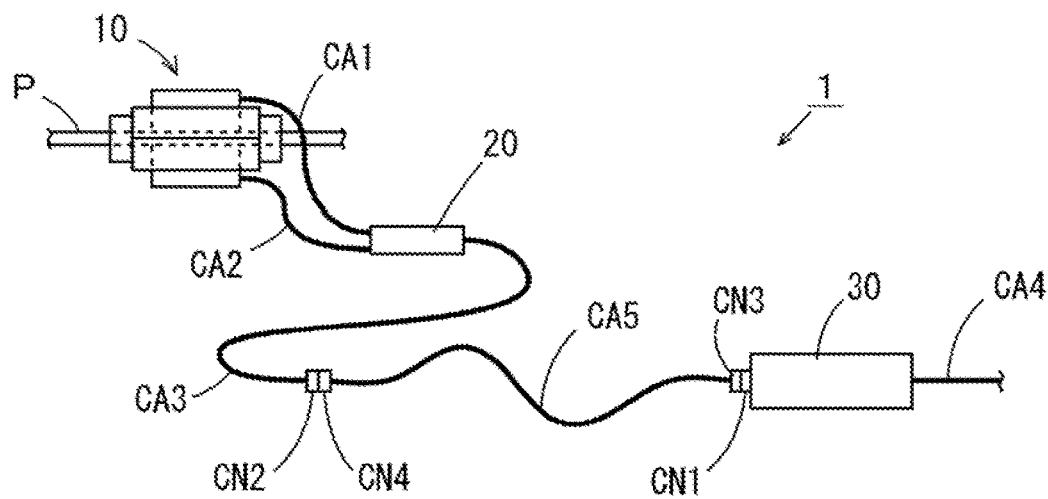
FIG. 13 is a schematic diagram showing a use example of an extension cable in the flow sensor shown in FIG. 1.

The flow sensor 1 may include an extension cable configured to be connectable between the relay cable CA3 and the main body section 30. FIG. 13 is a schematic diagram showing a use example of the extension cable in the flow sensor 1 shown in FIG. 1.

An extension cable CA5 in this example is a non-shield cable having the same configuration as the configuration of the relay cable CA3. As shown in FIG. 13, connectors CN3 and CN4 are provided at both end portions of the extension cable CA5. One connector CN3 of the extension cable CA5 is configured to be detachably attachable to the connector CN2 of the relay cable CA3. The other connector CN4 of the extension cable CA5 is configured to be detachably attachable to the connector CN1 of the main body section 30.

With such a configuration, by attaching and detaching the extension cable CA5, it is possible to easily adjust the distance between the intermediate section 20 and the main body section 30. Therefore, flexibility of setting of the head section 10 and the intermediate section 20 in the flow sensor 1 is improved.

[6] Effects (a) In the flow sensor 1 according to this embodiment, the first head cable CA1 is connected between the casing 11c of the head section 10 and the casing 20c of the intermediate section 20. The second head cable CA2 is connected between the casing 12c of the head section 10 and the casing 20c of the intermediate section 20.

In this case, the intermediate section 20 can be disposed in a position separated from the pipe P in a state in which the head section 10 is attached to the pipe P. Consequently, even when the first transmission circuit 202, the second transmission circuit 203, the amplifier circuit 204, and the A/D converter 205 in the intermediate section 20 respectively function as heat sources, heat generated from the heat sources is prevented from being transferred to a measurement target portion of the pipe P. Therefore, deterioration in measurement accuracy due to a rise in the temperature of the fluid in the pipe P is prevented.

In the intermediate section 20, the amplifier circuit 204 and the A/D converter 205 are used in common for the first and second ultrasonic elements 101 and 102 by the switching circuit 201. Consequently, it is unnecessary to provide two amplifier circuits 204 and two A/D converters 205 respectively corresponding to the first and second ultrasonic elements 101 and 102. Therefore, deterioration in measurement accuracy due to fluctuation in an operation characteristic that occurs among a plurality of amplifier circuits 204 and fluctuation in an operation characteristic that occurs among a plurality of A/D converters 205 does not occur.

The first and second head cables CA1 and CA2 are connected between the head section 10 and the intermediate section 20 and the relay cable CA3 is connected between the intermediate section 20 and the main body section 30. In this case, it is possible to reduce the length of the first and second head cables CA1 and CA2 compared with when the components of the intermediate section 20 are provided in the main body section 30 and only the first and second head cables CA1 and CA2 are connected between the head section 10 and the main body section 30. Consequently, attenuation of an ultrasonic signal of an analog format transmitted through the first and second head cables CA1 and CA2 is reduced. The influence of disturbance on the ultrasonic signal transmitted through the first and second head cables CA1 and CA2 is reduced.

Since the first transmission circuit 202, the second transmission circuit 203, the amplifier circuit 204, and the A/D converter 205 are not provided in the head section 10, it is possible to reduce the head section 10 in size. Therefore, even when the work space is limited, it is possible to relatively easily attach the head section 10 to the pipe P.

As a result, the flow sensor 1 capable of highly accurately measuring a flow rate and having improved handleability during attachment to the pipe P is realized.

(b) The relay cable CA3 and the main body section 30 are detachably attachable by the connectors CN1 and CN2. Therefore, a component including the head section 10, the intermediate section 20, and the first and second head cables CA1 and CA2 can be replaced integrally with respect to the main body section 30. In this case, since the correction information is stored in the correction-information storing section 207 provided in the intermediate section 20, it is unnecessary to perform setting of the correction information during the replacement.

(c) In the head section 10, the first and second head sections 11 and 12 respectively corresponding to the first and second ultrasonic elements 101 and 102 can be individually treated. Therefore, it is possible to individually perform attachment work of the first head section 11 to the pipe P and attachment work of the second head section 12 to the pipe P. Therefore, it is easier to perform attachment work of the head section 10 to the pipe P.

(d) The intermediate section 20 can generate measurement information of a digital format on the basis of an ultrasonic signal of a digital format after A/D conversion processing. Therefore, by causing the relay cable CA3 to transmit the measurement information in a digital signal format, the influence of disturbance on data of the measurement information is reduced.

(e) In the flow sensor 1 according to this embodiment, since the correction-information storing section 207 is housed in the casing 20c of the intermediate section 20, an increase in the size of the head section 10 is prevented.

(f) In the main body section 30, electric power supplied from the outside of the flow sensor 1 is supplied to the components in the casing 30c by the power supply circuit 307 and supplied to the intermediate section 20 through the relay cable CA3. In the intermediate section 20, electric power supplied from the main body section 30 is supplied to the components in the casing 20c by the power supply circuit 209. With such a configuration, in the intermediate section 20, it is unnecessary to provide a battery for operating the components in the casing 20c. Therefore, replacement work of a battery in the intermediate section 20 is unnecessary.

(g) The first and second head cables CA1 and CA2 include the shield cables. Consequently, the influence of disturbance on an ultrasonic signal of an analog format transmitted through the first and second head cables CA1 and CA2 is further reduced.

(h) As explained above, the display lamp 103 provided in the head section 10 is lit or flashed in response to the third driving signal. The third driving signal is generated on the basis of, for example, an ON/OFF signal generated by the main-body control section 302 of the main body section 30. In this case, a display form of the display lamp 103 is controlled according to a comparison result of a calculated flow rate and a threshold. Therefore, the user can easily grasp the comparison result of the flow rate of the fluid and the threshold by visually recognizing the display lamp 103.

In the configuration explained above, since the display-lamp driving circuit 210 for operating the display lamp 103 is provided in the intermediate section 20. Therefore, an increase in the size of the head section 10 is prevented.

[7] Other Embodiments (a) In the embodiment explained above, the first head cable CA1 is provided to connect the first head section 11 of the head section 10 and the intermediate section 20 and the second head cable CA2 is provided to connect the second head section 12 of the head section 10 and the intermediate section 20. However, the present invention is not limited to this.

Figure 14:
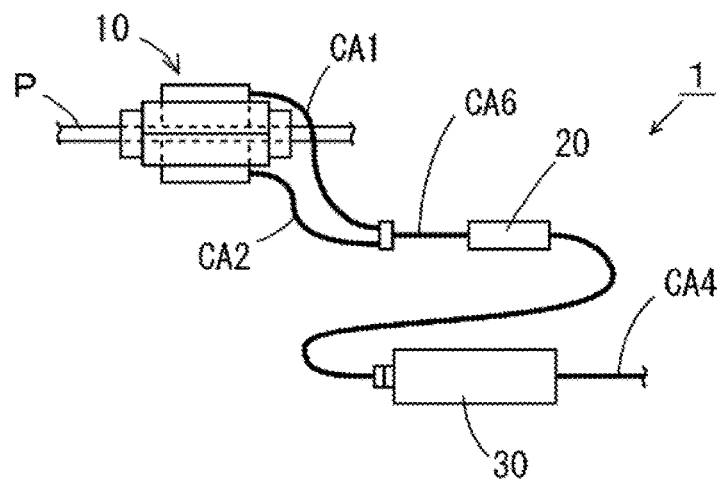
FIG. 14 is a schematic diagram showing another configuration example of the flow sensor.

FIG. 14 is a schematic diagram showing another configuration example of the flow sensor 1. As shown in FIG. 14, one cable CA6 may be formed by bundling a part of the first head cable CA1 and a part of the second head cable CA2. The formed cable CA6 may be connected to the intermediate section 20.

(b) In the embodiment explained above, the first and second ultrasonic elements 101 and 102 are respectively individually housed in the two casings 11c and 12c. However, the present invention is not limited to this. The first and second ultrasonic elements 101 and 102 may be housed in one casing. For example, a casing having a U-shaped cross section attachable to the pipe P to clamp a part of the pipe P is assumed. In this case, in the casing, the first and second ultrasonic elements 101 and 102 may be provided to be opposed to each other across a space for clamping the pipe P. With this configuration, it is possible to integrally treat the head section 10.

(c) In the embodiment explained above, the first and second transmission circuits 202 and 203 respectively corresponding to the first and second ultrasonic elements 101 and 102 are individually provided in the intermediate section 20. However, the present invention is not limited to this. One transmission circuit that generates the first and second driving signals respectively corresponding to the first and second ultrasonic elements 101 and 102 may be provided in the intermediate section 20.

In this case, the switching circuit 201 is configured to be capable of switching a connection state of the transmission circuit and the first and second ultrasonic elements 101 and 102, whereby the transmission circuit can be used in common for the first and second ultrasonic elements 101 and 102. Consequently, deterioration in measurement accuracy due to fluctuation in an operation characteristic that occurs among a plurality of transmission circuits does not occur.

(d) In the embodiment explained above, Expression (1) is corrected using the correction information in order to accurately measure a flow rate of the fluid flowing in the pipe P. An actual flow rate is calculated on the basis of a formula after the correction. However, the present invention is not limited to this. Expression (1) may not be corrected depending on accuracy required of measurement of a flow rate. In this case, it is unnecessary to provide the correction-information storing section 207 in the intermediate section 20.

(e) In the embodiment explained above, a time difference is generated as the measurement information in the measurement-information generating section 206b of the intermediate section 20. However, the present invention is not limited to this.

Various kinds of information (the inner diameter of the pipe P, velocity of an ultrasonic wave in the fluid, an incident angle of the ultrasonic wave on the fluid, a flow rate correction coefficient, and the like) set in advance in the main body section 30 before measurement of a flow rate may be stored in the relay control section 206 of the intermediate section 20. In this case, the measurement-information generating section 206b may generate measurement information in the same manner as in the example in the embodiment and thereafter calculate a flow rate of the fluid on the basis of the generated measurement information, the various kinds of information, Expression (1), and the correction information. In this case, a calculated flow rate value is output to the main body section 30 by the communication circuit 208 through the relay cable CA3.

(f) In the flow sensor 1 according to the embodiment, a flow rate of the fluid flowing in the pipe P is calculated on the basis of a time difference calculated in the intermediate section 20. However, velocity of the fluid flowing in the pipe P may be calculated in addition to the flow rate. In this case, the velocity of the fluid may be calculated by the measurement-information generating section 206b of the intermediate section 20 or may be calculated by the main-body control section 302 of the main body section 30.

As in Expression (1) described above, when $\Delta t$ represents the time difference, d represents the inner diameter of the pipe P, $V_s$ represents velocity of an ultrasonic wave, and $\theta$ represents an incident angle of the ultrasonic wave, velocity $V_1$ of the fluid flowing in the pipe P can be theoretically represented by Expression (2) described below.

$$V_1 = (V_s^2/2d \tan \theta) \cdot \Delta t \tag{2}$$

In this case, as in the example of the calculation method for a flow rate in the embodiment, by correcting Expression (2), it is possible to calculate accurate speed using a formula after the correction.

(g) In the embodiment explained above, each of the first and second head cables CA1 and CA2 includes the shield cable. However, the present invention is not limited to this. Each of the first and second head cables CA1 and CA2 may be configured by a non-shield cable not including a shield layer.

(h) In the embodiment explained above, the connectors CN1 and CN2 are respectively provided in the casing 30c of the main body section 30 and the relay cable CA3, whereby the relay cable CA3 and the main body section 30 are configured to be detachably attachable. However, the present invention is not limited to this.

Instead of the connectors CN1 and CN2 being respectively provided in the casing 30c of the main body section 30 and the relay cable CA3, two connectors configured to be detachably attachable to each other may be provided in the casing 20c of the intermediate section 20 and the relay cable CA3. In this case, the relay cable CA3 and the intermediate section 20 are detachably attachable.

Alternatively, the connectors CN1 and CN2 may be respectively provided in the casing 30c of the main body section 30 and the relay cable CA3 and the two connectors configured to be detachably attachable to each other may be provided in the casing 20c of the intermediate section 20 and the relay cable CA3. In this case, the relay cable CA3 and the main body section 30 are detachably attachable and the relay cable CA3 and the intermediate section 20 are detachably attachable.

(i) In the embodiment explained above, the pipe P to which the head section 10 is attached is the resin pipe. However, the present invention is not limited to this. The pipe P may be a metal pipe.

(j) In the embodiment explained above, the first head section 11 and the second head section 12 are disposed in a so-called Z-type disposition. However, the present invention is not limited to this. The first head section 11 and the second head section 12 may be provided in disposition in which the first head section 11 and the second head section 12 are disposed side by side in the axil direction of the pipe P (so-called V-type disposition).

In the V-type disposition, an ultrasonic wave transmitted by the first ultrasonic element 101 is made incident on the fluid in the pipe P at the incident angle $\theta$ and thereafter reflected by the inner surface of the pipe P at a reflection angle $\theta$ and received by the second ultrasonic element 102. Similarly, an ultrasonic wave transmitted by the second ultrasonic element 102 is made incident on the fluid in the pipe P at the incident angle $\theta$ and thereafter reflected by the inner surface of the pipe P at the reflection angle $\theta$ and received by the first ultrasonic element 101.

In this case, the flow rate Q of the fluid flowing in the pipe P is calculated on the basis of Expression (3) described below. In Expression (3), $\Delta t$ represents the time difference calculated in the intermediate section 20, d represents the inner diameter of the pipe P, $\theta$ represents the incident angle of the ultrasonic wave in the fluid, $V_s$ represents the velocity of the ultrasonic wave in the fluid, and K represents the flow rate correction coefficient.

$$Q = (1/K) \cdot (\pi d V_s^2 / 16 \tan \theta) \cdot \Delta t \tag{3}$$

In this case, as in the example of the calculation method for a flow rate in the embodiment explained above, by correcting Expression (3), it is possible to calculate an accurate flow rate using a formula after the correction.

(k) In the embodiment explained above, the resin member 113 is filled in the casing 11c of the first head section 11 and the casing 12c of the second head section 12 and the resin member 211 is filled in the casing 20c of the intermediate section 20. However, the present invention is not limited to this. The resin members 113 and 211 may not be filled in the casings 11c, 12c, and 20c.

(l) In the embodiment explained above, the correction-information storing section 207 is provided in the intermediate section 20. However, the present invention is not limited to this. The correction-information storing section 207 may be provided in the main body section 30 instead of the intermediate section 20.

[8] Correspondence Relation Between the Constituent Elements of the Claims and the Sections in the Embodiment An example of correspondence between the constituent elements of the claims and the sections in the embodiment is explained bellow. However, the present invention is not limited to the example explained below.

In the embodiment, the pipe P is an example of the pipe. The flow sensor 1 is an example of the clamp-on type ultrasonic flow sensor. The first and second transmission circuits 202 and 203 are examples of the driving circuit. The first ultrasonic element 101 is an example of the first ultrasonic element. The second ultrasonic element 102 is an example of the second ultrasonic element. The amplifier circuit 204 and the A/D converter 205 are example of the signal processing section. The switching circuit 201 is an example of the switching section.

The measurement-information generating section 206b is an example of the information generating section. The main-body control section 302 or the measurement-information generating section 206b is an example of the flow-rate calculating section. The main-body control section 302, the operation section 304, and the storing section 305 is an example of the condition setting section. The output circuit 306 is an example of the output section. The casings 11c and 12c are examples of the head housing. The casing 20c is an example of the intermediate housing. The casing 30c is an example of the main body housing.

The first and second head cables CA1 and CA2 are examples of the first cable. The relay cable CA3 is an example of the second cable. The A/D converter 205 is an example of the analog/digital converter. The amplifier circuit 204 is an example of the amplifier circuit. The correction-information storing section 207 is an example of the correction storing section. The communication circuit 208 is an example of the communication circuit.

The power supply circuit 209 is an example of the first power supply circuit. The power supply circuit 307 is an example of the second power supply circuit. The beam 530 is an example of the fixing member. The display lamp 103 is an example of the display lamp. The display-lamp driving circuit 210 is an example of the display-lamp driving circuit. The display-lamp control section 206c is an example of the display-lamp control section.

The casing 11c is an example of the first head housing. The casing 12c is an example of the second head housing. The first head cable CA1 is an example of the first head cable. The second head cable CA2 is an example of the second head cable. The attachment hole 290 is an example of the attachment hole.

As the constituent elements of the claims, other various elements having the configurations or the functions described in the claims can also be used.

What is claimed is:

1. A clamp-on type ultrasonic flow sensor that measures a flow rate of fluid flowing in a pipe, the clamp-on type ultrasonic flow sensor comprising:
    a driving circuit generating a first driving signal and a second driving signal;
    an intermediate housing which houses the driving circuit;
    a first cable connected to the intermediate housing;
    a second cable connected to the intermediate housing;
    a first ultrasonic element, electrically coupled to the driving circuit via the first cable, transmitting an ultrasonic wave in response to the first driving signal and receiving an ultrasonic wave;
    a head housing connected to the first cable and coupled to the intermediate housing via the first cable, which houses the first ultrasonic element;
    a second ultrasonic element, electrically coupled to the driving circuit, transmitting an ultrasonic wave in response to the second driving signal and receiving an ultrasonic wave;
    a signal processing section disposed in the intermediate housing, configured to perform predetermined signal processing on ultrasonic signals output from the first and second ultrasonic elements;
    a switching circuit disposed in the intermediate housing, which switches a first state in which the second ultrasonic element and the signal processing section are connected and a second state in which the first ultrasonic element and the signal processing section are connected;
    an information generating section disposed in the intermediate housing, configured to generate, as measurement information, information concerning a flow rate of the fluid in the pipe on the basis of the ultrasonic signals after the signal processing by the signal processing section;
    a flow-rate calculating section configured to calculate a flow rate value on the basis of the measurement information generated by the information generating section;
    a condition setting section for setting an output condition of a flow rate value that should be output to an outside of the clamp-on type ultrasonic flow sensor;
    a main body housing connected to the second cable, which houses the condition setting section; and
    an output section disposed in the main body, configured to output the flow rate value calculated by the flow-rate calculating section to the outside of the clamp-on type ultrasonic flow sensor according to the output condition;
    wherein the first cable connected between the head housing and the intermediate housing and configured to transmit the first driving signal and the ultrasonic signal output from the first ultrasonic element, and
    wherein the second cable connected between the intermediate housing and the main body housing and configured to transmit one of the measurement information generated by the information generating section and the flow rate value calculated by the flow-rate calculating section.

2. The clamp-on type ultrasonic flow sensor according to claim 1, wherein
    the ultrasonic signals output from the first and second ultrasonic elements have an analog signal format, and
    the signal processing section includes an analog/digital converter configured to perform, as the signal processing, analog/digital conversion processing on the ultrasonic signals output from the first and second ultrasonic elements.

3. The clamp-on type ultrasonic flow sensor according to claim 1, wherein the signal processing section includes an amplifier circuit configured to perform, as the signal processing, amplification processing on the ultrasonic signals output from the first and second ultrasonic elements.

4. The clamp-on type ultrasonic flow sensor according to claim 1, further comprising a correction storing section configured to store correction information for correcting a predetermined relation between the measurement information and a flow rate of the fluid in the pipe, wherein
    the flow-rate calculating section calculates a flow rate value on the basis of the measurement information generated by the information generating section and the correction information stored in the correction storing section, and
    the intermediate housing further houses the correction storing section.

5. The clamp-on type ultrasonic flow sensor according to claim 1, further comprising a communication circuit configured to cause the second cable to transmit the measurement information generated by the information generating section or the flow rate value calculated by the flow-rate calculating section, wherein
    the intermediate housing further houses the communication circuit.

6. The clamp-on type ultrasonic flow sensor according to claim 1, further comprising:
    a first power supply circuit configured to supply electric power to the driving circuit, the signal processing section, the switching section, and the information generating section; and
    a second power supply circuit configured to supply electric power to the condition setting section, the output section, and the first power supply circuit, wherein
    the intermediate housing further houses the first power supply circuit,
    the main body housing further houses the second power supply circuit, and
    the second cable is configured to further transmit electric power.

7. The clamp-on type ultrasonic flow sensor according to claim 1, wherein
    the intermediate housing has an elongated shape extending in one direction,
    the first cable is connected to one end of the intermediate housing, and
    the second cable is connected to another end of the intermediate housing.

8. The clamp-on type ultrasonic flow sensor according to claim 1, wherein the intermediate housing is configured to be supportable in a state in which the intermediate housing is suspended from any fixing member by at least one cable of the first and second cables.

9. The clamp-on type ultrasonic flow sensor according to claim 1, further comprising:
a display lamp attached to the head housing;
a display-lamp driving circuit configured to generate a third driving signal for driving the display lamp; and
a display-lamp control section configured to control the display-lamp driving circuit on the basis of a flow rate value corresponding to the measurement information generated by the information generating section, wherein
the intermediate housing further houses the display-lamp driving circuit and the display-lamp control section, and
the first cable further transmits the third driving signal.

10. The clamp-on type ultrasonic flow sensor according to claim 1, wherein
the head housing includes:
a first head housing configured to store the first ultrasonic element; and
a second head housing configured to house the second ultrasonic element, and
the first cable includes:
a first head cable connected between the first head housing and the intermediate housing to transmit the first driving signal and the ultrasonic signal output from the first ultrasonic element; and
a second head cable connected between the second head housing and the intermediate housing to transmit the second driving signal and the ultrasonic signal output from the second ultrasonic element.

11. The clamp-on type ultrasonic flow sensor according to claim 1, wherein the information generating section generates, as the measurement information, a difference between a propagation time of the ultrasonic wave transmitted from the first ultrasonic element to the second ultrasonic element through the fluid and a propagation time of the ultrasonic wave transmitted from the second ultrasonic element to the first ultrasonic element.

12. The clamp-on type ultrasonic flow sensor according to claim 1, wherein an attachment hole for attaching the intermediate housing to any fixing member is formed in the intermediate housing.

\* \* \* \* \*